United States Patent [19]

Paterick

[11] 4,201,407
[45] May 6, 1980

[54] TUBULAR ASSEMBLY

[75] Inventor: Robert J. Paterick, Concord, Tenn.

[73] Assignee: Maremont Corporation, Chicago, Ill.

[21] Appl. No.: 953,954

[22] Filed: Oct. 23, 1978

[51] Int. Cl.² .............................................. F16L 37/00
[52] U.S. Cl. .................................. 285/304; 285/305;
285/399; 285/423
[58] Field of Search .................. 285/1, 7, 81, 82, 304,
285/305, 308, 317, 360, 361, 374, 376, 399, 401,
402, 27, 424, 382, DIG. 22, 322; 403/361, 404

[56] References Cited

U.S. PATENT DOCUMENTS

| 3,178,208 | 4/1965 | Koehler | 285/322 |
| 3,222,090 | 12/1965 | Powers | 285/27 |
| 3,327,945 | 6/1967 | Pfister | 285/424 X |
| 3,733,577 | 5/1973 | Hammond | 285/305 X |
| 3,889,984 | 6/1975 | Lambiris | 285/27 |
| 4,113,289 | 9/1978 | Wagner | 285/382 |

FOREIGN PATENT DOCUMENTS 724201 4/1932 France .......................................... 285/7

Primary Examiner—Dave W. Arola
Attorney, Agent, or Firm—Cushman, Darby & Cushman

[57] ABSTRACT

A tubular assembly embodying a pin and slot connection between two thin wall tubular members having end portions disposed in telescopic relation with respect to one another. The outer tubular member having the slot also has an opening extending therethrough in closely spaced relation to its edge in a position generally alongside the slot providing an axially elongated wall portion between the opening and slot. The wall portion has a fixed integral outer end spaced axially outwardly of an intermediate locking section of the slot and a fixed integral inner end spaced axially inwardly of the intermediate locking section of the slot and is operable to resiliently deflect laterally when the pin is moved axially inwardly through the slot to thereby permit the locking section of the slot to expand in its width dimension and permit yielding passage of the pin axially thereby into received relation within the inner section of the slot.

6 Claims, 5 Drawing Figures

U.S. Patent  May 6, 1980  4,201,407
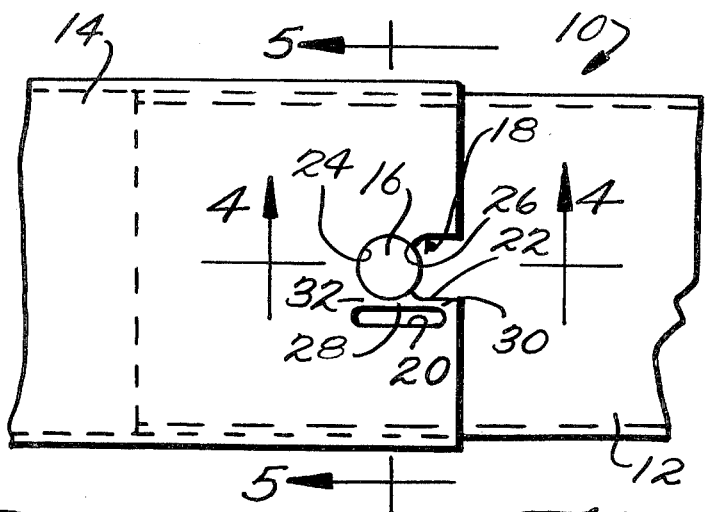
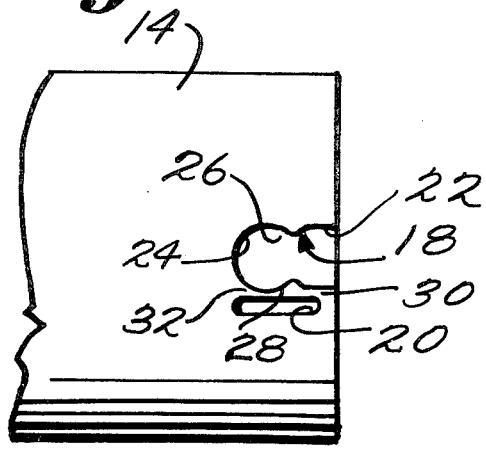
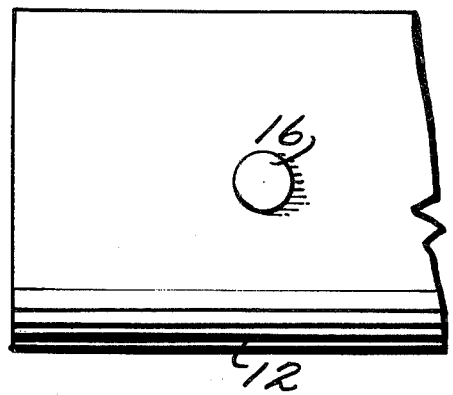
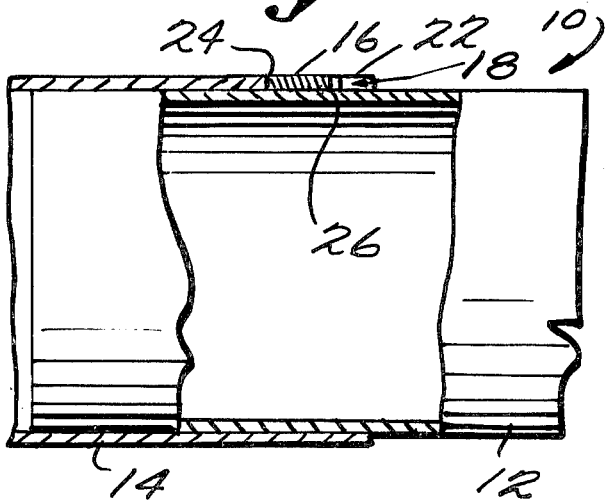
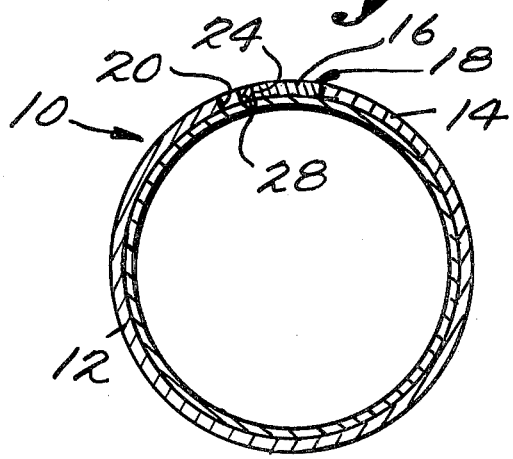

TUBULAR ASSEMBLY

This invention relates to tubular assemblies and more particularly to tubular assemblies of the type embodied in engine exhaust systems.

It is often the case in installing engine exhaust systems in an automobile that the components of the exhaust system must be initially assembled before being mounted on the vehicle. In many instances it is important in effecting the assembly of the tubular components of the exhaust system to maintain a proper angular orientation of one tubular component with respect to the tubular component to which it is connected. The usual known connection under circumstances of this type is to telescopically interrelate the end portions of adjacent tubular members and to provide one or more axial slots in the end portion of the outer tubular member and to provide a mating projection on the telescopic end of the inner tubular member. Examples of prior arrangements of this type are disclosed in U.S. Pat. Nos. 3,178,208; 3,222,090; and 3,889,984.

As is indicated in the disclosure of the above-identified patents, it is usual to initially establish the telescopic interconnection wherein the projection or pin is engaged within the slot and then to subsequently apply hangers and clamps to the assembly in order to effect proper mounting thereof on the automotive vehicle frame. It is desirable in the overall handling of systems of this type to insure the maintenance of the tubular members in their pre-assembled orientation prior to the final clamping and mounting of the assembly on the automotive vehicle.

It is an object of the present invention to effectively maintain the pre-assembled telescopic relationship of such an assembly without materially adding to the cost of the assembly. In accordance with the principles of the invention, this objective is obtained by providing, in addition to the pin and slot, an opening in the end portion of the outer tubular member which is positioned in closely spaced relation inwardly from the free edge thereof and alongside the pin receiving slot thereof. The slot is configured so as to include an outer axially open pin entrance section of a width to receive the pin therethrough, an inner axially inwardly closed pin receiving section and an intermediate locking section of a width smaller than the width of the pin. The opening and slot provide an axially elongated wall portion therebetween having a fixed integral outer end spaced axially outwardly of the intermediate locking section of the slot and a fixed integral inner end spaced axially inwardly of the intermediate locking section of the slot for enabling the elongated wall portion between the fixed ends thereof to resiliently deflect laterally when the pin or projection of the other tubular member is moved axially inwardly through the slot to thereby permit the locking section of the slot to expand in its width dimension and permit yielding passage of the pin axially thereby into received relation within the inner section of the slot where the locking section engages the same and retains it therein.

It can be seen that the arrangement does not necessitate any appreciable increase in the costs heretofore required in providing a conventional pin and slot arrangement. That is, the opening can be formed in the telescopic end portion of the outer tube by a simple punching operation simultaneously with the punching operation which provides the slot. The effectiveness of the connection provided is of high efficiency since the elongated wall portion which provides the resilient yielding action necessary to retain the tubular elements in telescopic relation is not subject to damage or permanent deformation to the same extent as are resilient cantilevered fingers.

Accordingly, it is a further object of the present invention to provide a tubular assembly of the type described which is simple in construction, effective in operation and economical to manufacture. These and other objects of the present invention will become more apparent during the course of the following detailed description and appended claims.

The invention may best be understood with reference to the accompanying drawings wherein an illustrative embodiment is shown.

In the drawings:

FIG. 1 is a front elevational view of a tubular assembly embodying the principles of the present invention;

FIG. 2 is a front elevational end view of the female telescopic tubular member of the assembly shown in FIG. 1;

FIG. 3 is a front elevational view of the male telescopic tubular member of the assembly shown in FIG. 1;

FIG. 4 is a fragmentary sectional view taken along the line 4—4 of FIG. 1; and

FIG. 5 is a sectional view taken along the line 5—5 of FIG. 1.

Referring now more particularly to the drawings, there is shown in FIG. 1 a tubular assembly, generally indicated at 10, which embodies the principles of the present invention. The assembly includes a first thin wall tubular member 12 and a second thin wall tubular member 14 having end portions assembled in telescopic relation with respect to one another. As shown, the telescopic end portion of the tubular member 12 constitutes the inner or male part of the connection, whereas the telescopic end portion of the tubular member 14 constitutes the outer or female part of the connection.

Formed on the telescopic end portion of the tubular member 12 is a pin 16 which extends radially in a generally outward direction. As shown, the pin is in the form of a separate tab or projection welded to the exterior periphery of the telescopic end portion of the tubular member 12. As shown, the pin is in cylindrical form. It will be understood that the pin may have other configurations and be provided by other structures, as for example, the pin may be provided by deforming the wall itself.

Formed in the telescopic end portion of the tubular member 14 is a slot, generally indicated at 18, which extends from the edge of the telescopic end portion axially inwardly into the latter and an opening 20 extending therethrough in a position closely spaced with respect to the edge and generally alongside the slot 18. The slot 18 includes an outer axially open pin entrance section 22 which has a width slightly greater than the width of the pin 16. The slot also includes an inner axially inwardly closed pin receiving section 24 which is of a size generally equal to the size of the pin so as to receive the latter therein. Finally, the slot includes an intermediate locking section 26 between the inner and outer sections 22 and 24 which has a width smaller than the width of the pin 16.

As shown, the sections 22, 24 and 26 of the slot 18 are defined by a generally U-shaped edge of the wall forming the tubular member 14. The portions of the wall edge which define the locking section 26 are both of generally curved convex configuration, although it will be understood that either one of the edge portions may be generally straight if desired. The edge portions defining the outer slot section 22 are generally straight and parallel with one another while the edge defining the inner slot section is of arcuate configuration.

The outer tubular member 14 provides an axially elongated wall portion 28 between the opening 20 and the slot 18. The elongated wall portion 28 has an axially outer end 30 which is fixed integrally in a position spaced axially outwardly of the intermediate locking slot section 26. The elongated wall portion 28 also has an axially inward end 32 which is fixed integrally in a position spaced axially inwardly of the intermediate locking slot section 26.

In operation, tubular member 12 is assembled with tubular member 14 by engaging the telescopic end portion of the tubular member 12 within the telescopic end portion of the tubular member 14 until the pin 16 is adjacent the edge of the tubular member 14. The tubes are then rotated relative to one another about their common axis until pin 16 is aligned with the outer entrance section 22 of the slot 18. The tubular members 12 and 14 are then moved relatively together so that the pin 16 passes through the outer entrance section 22 of the slot and into engagement with the locking section 26 thereof. Since the width of the locking section 26 is smaller than the width of the pin 16, the axial movement of the latter has a camming action on the convex edge surfaces defining the locking section which causes the elongated wall portions 28 to resiliently deflect laterally. The locking section thus expands in its width dimension to permit passage of the pin 16 thereby and the inherent resiliency of the wall portion 28 due to its integral end connections 30 and 32 will cause the locking section of the slot to return to its normal position engaging the pin and retaining the same in received relation with the inner pin receiving section 24 of the slot. With the cammed configuration of the locking section 26 the inherent resiliency of the wall portion 28 permits the tubular members to be dis-assembled in response to a relative pulling movement of the two members in a direction away from one another. It will be understood that a barbed or ratcheted configuration making dis-assembly more difficult may be utilized if desired.

It will also be understood that after assembly as indicated above, clamps and hangers (not shown) may then be utilized to mount the assembly in operative position on an automotive vehicle frame as indicated in the aforesaid patents, the disclosures of which, in this regard, are hereby incorporated by reference into the present specification.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A tubular assembly comprising:

first and second thin wall tubular members having end portions disposed in telescopic relation with respect to one another, said first tubular member having a pin extending generally radially from the telescopic end portion thereof, said second tubular member having a slot through its wall extending from the edge of the telescopic end portion thereof axially inwardly into the latter and an opening extending through the wall of said second tubular member in closely spaced relation to said edge in a position generally alongside said slot, said slot including an outer axially open pin entrance section of a width to receive said pin therethrough, an inner axially inwardly closed pin receiving section receiving said pin therein, and an intermediate locking section of a width smaller than the width of said pin engaged with said pin to retain the same in said inner section, said second tubular member providing an axially elongated wall portion between said opening and said slot having a fixed integral outer end spaced axially outwardly of the intermediate locking section of said slot and a fixed integral inner end spaced axially inwardly of the intermediate locking section of said slot for enabling the elongated wall portion between said fixed ends to resiliently deflect laterally when said pin is moved axially inwardly through said slot to thereby permit the locking section of said slot to expand in its width dimension and permit yielding passage of said pin axially thereby into said received relation within the inner section of said slot.

2. A tubular assembly as defined in claim 1 wherein said pin is cylindrical.

3. A tubular assembly as defined in claim 2 wherein said pin constitutes a separate tab welded to the periphery of said first tubular member.

4. A tubular assembly as defined in claim 1 or 3 wherein said slot is defined by a generally U-shaped edge, the bight portion of said U-shaped edge defining said inner slot section being arcuate.

5. A tubular assembly as defined in claim 4 wherein the portions of said U-shaped edge defining said intermediate slot section are smoothly convexly curved.

6. A tubular assembly as defined in claim 5 wherein the portions of said U-shaped edge defining said outer slot section are generally parallel.

* * * * *